United States Patent [19]
Leas et al.

[11] 3,753,671
[45] Aug. 21, 1973

[54] PRODUCTION OF SYNTHETIC NATURAL GAS AND HYDROGEN FROM THE GASIFICATION OF CARBONACEOUS MATERIALS

[75] Inventors: Lawrence E. Leas, Simi, Calif.; Robert L. Leas; Cecil J. Johnson, Columbia City, Ind.

[73] Assignee: Leas Brothers Development Corporation, Columbia City, Ind.

[22] Filed: July 9, 1971

[21] Appl. No.: 161,196

[52] U.S. Cl. .............................. 48/210, 48/197 R
[51] Int. Cl. .................................... C10j 3/04
[58] Field of Search .................. 48/197, 210, 202, 48/203, 101

[56] References Cited
UNITED STATES PATENTS
2,840,462  6/1958  Gorin .............................. 48/203 X
3,194,644  7/1965  Gorin et al ....................... 48/197

Primary Examiner—Morris O. Wolk
Assistant Examiner—R. E. Serwin
Attorney—John J. Byrne

[57] ABSTRACT

A method of producing synthetic natural gas using the gasification products of coke, coal, or other carbonaceous materials.

7 Claims, 1 Drawing Figure

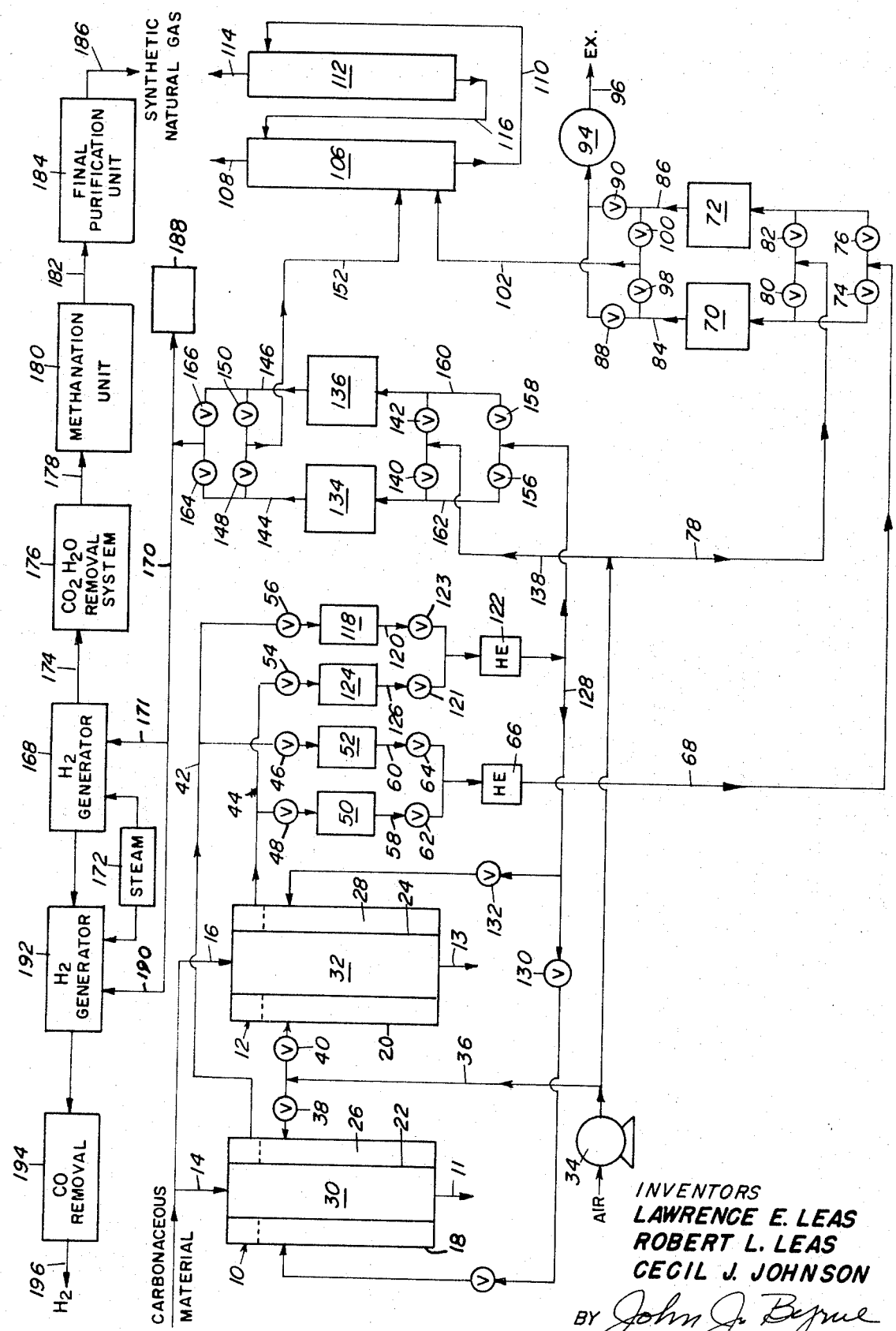

PRODUCTION OF SYNTHETIC NATURAL GAS AND HYDROGEN FROM THE GASIFICATION OF CARBONACEOUS MATERIALS

This invention relates to the production of hydrogen and natural gas, and more particularly, this invention relates to the production of hydrogen and natural gas using the gasification products of coke, coal, char or other carbonaceous materials.

With demand for natural gas increasing, there is a corresponding increase in research efforts directed toward the discovery of new methods for synthetically producing netural gas. The derivation of synthetic natural gas from petroleum products has increased the already critically high demand on our petroleum resources.

Another method of producing natural gas involves the direct reaction of hydrogen and steam with carbonaceous materials, a rather expensive process.

It is an objective of this invention to provide a method for producing hydrogen and natural gas from coal or other carbonaceous materials. Coal is one of our most abundant forms of energy resources, and is relatively inexpensive in comparison to petroleum or other sources from which natural gas is derived.

It is a further object of this invention to gasify coal or other carbonaceous materials to carbon monoxide. The carbon monoxide is desulfurized prior to being reacted with steam for the production of hydrogen.

In the process of this invention a high purity carbon monoxide is used in the production of hydrogen by gasifying a carbonaceous bed with hot carbon dioxide. The use of carbon dioxide in the gasification process is preferred since the use of oxygen is economically undesirable, and the use of air is undesirable due to the large concentration of nitrogen which must be removed by relatively costly operations. The high carbon monoxide content gas from the reaction in the gasification step is reacted with steam to produce hydrogen. The hydrogen and carbon monoxide are then converted to methane after the removal of carbon dioxide and water vapor. Any residual carbon dioxide and water vapor is removed in a final purification step to produce a high methane content gas as in the end product. A portion of the high purity carbon monoxide is diverted for use in the production of hydrogen as the end product.

The high content carbon monoxide gas is desulfurized prior to the hydrogen and natural gas production steps by passing the carbon monoxide through a metal oxide bed such as a cobalt oxide bed wherein sulfur contaminates react with the oxide to form a sulfide, while the carbon monoxide continues through the bed with only a portion thereof reacting with the oxide to form carbon dioxide due to the excessive amount of carbon monoxide relative to the cobalt oxide. In the alternative cycle the reduced cobalt bed is oxidized back to the higher cobalt oxide by the injection of air which reacts with the sulfide to form sulfur dioxide which is carried off and recovered.

More particularly, this invention is directed toward a method of producing synthetic natural gas comprising the steps of producing carbon dioxide by reacting carbon monoxide with a cobalt oxide. The carbon dioxide formed by the reaction of carbon monoxide with the cobalt oxide is reacted with carbon in a carbon gasifier to produce a carbon monoxide rich gaseous product. The carbon monoxide is desulfurized in a cobalt oxide bed wherein the sulfur contaminates react with the cobalt to form cobalt sulfide. The high purity carbon monoxide is then reacted with steam in a hydrogen generator to produce hydrogen, and thereafter, additional amounts of carbon monoxide are reacted with hydrogen in a methanation unit to produce a high methane content gas.

The single drawing shows diagrammatically the method of this invention.

Referring now to the drawings, coke, coal, or other carbonaceous material are fed continuously to carbon gasifiers 10 and 12, via lines 14 and 16, respectively. The rate of feed of the carbonaceous materials depends upon the particular operation stage of the gasifiers, as will be explained more fully hereinafter. The gasifiers are of identical construction and comprise cylindrical outer shells 18 and 20, respectively, and inner concentric shells 22 and 24, respectively, of a diameter less than that of the outer shells. The outer shells form annular chambers 26 and 28, respectively, which chambers are filled with cobalt oxide. The central shell 22 and 24 of each of the gasifiers defines chambers 30 and 32, respectively, into which carbonaceous materials are fed via lines 14 and 16. The purpose of the two gasifiers is to provide continuous production of carbon monoxide by alternating the gasifiers. While one is producing carbon monoxide, the other is in an air-burn stage wherein air is injected into the carbonaceous material to burn it to the desired temperature.

In the air-burn stage, air is pumped in by a compressor 34, line 36 and either valve 38 or valve 40, depending upon which gasifier is in the air-burn stage. Excess air is sent through the cobalt oxide bed 26 or 28, to oxidize the cobalt and/or lower form of cobalt oxide reduced during the previous cycle back to the higher cobalt oxide whereby the air is preheated by the exothermic reaction. The gas consisting essentially of nitrogen and oxygen reaches the central chambers 30 and 32 of the gasifiers to cause a burning of the carbonaceous materials to the high temperature necessary for the gasification step.

The gases from the air-burn stage comprising mostly nitrogen and carbon dioxide and sulfur contaminants exit from the reactors 10 and 12, via lines 42 and 44, respectively, and valves 46 and 48 to high temperature filters 50 and 52. The filtered gases comprising mostly nitrogen and carbon dioxide exit from the high temperature filters 50 and 52 via lines 58 and 60, and valves 62 and 64, respectively, and through heat exchanger 66, wherein the cooled gases continue via line 68 to cobalt beds 70 and 72. The cobalt beds are used for desulfurization purposes, and are used alternately. The sulfur in the gases, primarily hydrogen sulfide, reacts with the cobalt oxide to produce cobalt sulfide thereby removing the sulfur from the gases. Simultaneously, the other bed is oxidized with air. The sulfide reacts with the oxygen in the air to form sulfur dioxide. The gases, depending upon the particular cycle, enter reactors 70 or 72 through valves 74 or 76, respectively. Air from compressor 34 enters the cobalt beds 70 or 72 via line 78, and valves 80 or 82.

In operation, the gases from line 68 comprising substantially nitrogen, carbon dioxide, and sulfur contaminates in the form of hydrogen sulfide enter cobalt bed 70 via open valve 74, whereby the cobalt oxide therein is reduced to cobalt or a lower form of cobalt oxide and the sulfur reacts with the cobalt to form cobalt sulfide. It is to be understood, of course, that valve 76, leading to bed 72 is closed during this particular cycle. Air, however, is being injected into the cobalt bed 72 via line 78 and open valve 82 for purposes of oxidizing the cobalt and reacting with sulfide to form sulfur dioxide. Valve 80 is closed during this particular cycle. The operation is then reversed, the alternate cycle such that cobalt bed 72 is in the desulfurizing stage while cobalt bed 70 is in the regeneration or oxidation stage.

The desulfurized gas from the desulfurization cycle exits from the cobalt reactors 70 and 72 via lines 84 and 86, respectively, and through valves 88 and 90 to line 92 and power wheel 94, whereby the gases are used as a power generation source. The gases are then exhausted to the atmosphere via line 96.

The nitrogen-rich stream containing sulfur dioxide from the regeneration phase of each cobalt bed is taken off via lines 84 and 86, and valves 98 and 100, respectively, depending upon which bed is being regenerated, and sent through line 102 to an absorber 106 wherein the sulfur dioxide is absorbed in a suitable absorbent. Nitrogen is taken off via line 108. The absorbent and absorbed sulfur dioxide is passed through line 110 to stripper 112 wherein the sulfur dioxide is stripped and taken off via line 114. The fluid is then recycled back to the absorber via line 116.

To this point, the treatment of only the gases exiting from the gasifiers 10 and 12 during the air-burn stage has been discussed. The following is a description of the treatment of the gases during the carbon monoxide production cycle. Assuming that gasifier 10 is in the carbon monoxide production stage and gasifier 12 is in the air-burn, carbon monoxide is introduced to the cobalt oxide in annular chamber 26, wherein the cobalt oxide is reduced to a metal and/or lower oxide and the carbon monoxide is oxidized to hot carbon dioxide in an exothermic reaction. The hot carbon dioxide then flows upwardly through the hot carbonaceous bed in the chamber 30, and reacts with the carbon therein in the reaction $CO_2 + C \rightarrow 2CO$. The carbon monoxide-rich gases leave the gasifier via line 42. The valve 56 is opened in the particular stage and the valve 46 is closed whereupon the gases in line 42 pass through the valve 56 to high temperature filter 118, and then through line 120 and valve 123 to heat exchanger 122. It is to be understood, of course, that the gasifier 12 is in the air-burn stage and the gaseous products therefrom are passed through the high temperature filter 50 and then through the desulfurizer and the power wheel as explained earlier herein. After the cobalt oxide in the gasifier 10 has been reduced and that in gasifier 12 has been oxidized or regenerated, the cycles are switched and the gasifier 12 goes into the carbon monoxide production phase. The carbon monoxide gases are taken off from gasifier 12 via line 44, and open valve 54 and sent through high temperature filter 124, line 126, valve 121 and heat exchanger 122. The ash after the gasifying step is dispensed from gasifiers 10 and 12 via lines 11 and 13, respectively.

The ratio of production of carbon monoxide to that injected in the cobalt oxide bed is approximately 2 to 1 under ideal conditions. A portion, approximately half, of the carbon monoxide produced is recycled via line 128 to the gasifiers through either valve 130 or 132 depending upon which gasifier is in the production stage. The other half of the carbon monoxide-rich gas is sent to a desulfurizing unit comprising cobalt oxide bed 134 and 136. The sulfur removal operation is substantially identical to that for the high nitrogen, and carbon dioxide content gases from the air-burn stage. The cobalt beds 134 and 136 also are used alternately.

During the regeneration stage of the cobalt desulfurizer, air is introduced via line 138 from the same compressor source 34 via either valve 140 or valve 142 depending upon which bed is being regenerated. The nitrogen-rich gas stream containing sulfur dioxide produced by the regeneration step is taken off via line 144 or 146 and through valve 148 or 150. The sulfur dioxide is then passed via line 152 to the absorber and stripper columns 106 and 112 to be treated in the manner described earlier. The carbon monoxide-rich gases pass via line 128 to one or the other of the beds 134 and 136 via either valve 156 or 158, and line 160 or 162 depending upon which bed is in the sulfur removal cycle. The desulfurized gases exit via lines 144 and 146, respectively and valves 164 and 166, respectively.

The carbon monoxide-rich desulfurized gases are sent to a hydrogen generator 168 via lines 170 and 171 wherein a portion of the carbon monoxide is reacted with steam from 172 to produce hydrogen. The gases leaving the hydrogen generator 168 comprise substantially carbon dioxide, carbon monoxide, hydrogen and water vapor. These gases are transferred via line 174 to a removal unit 176 wherein carbon dioxide and water or water vapor are removed. The remaining gas comprising essentially hydrogen and carbon monoxide are transferred via line 178 to a methanation unit 180 wherein a high methane content gas is produced. This gas is transferred via line 182 to a final purification unit 184 wherein carbon dioxide and water vapor are removed. The resultant product is a highly purified and economically produced synthetic natural gas which is taken off via line 186 and sent to storage. A portion of the carbon monoxide-rich gases may be taken off from line 170 and sent to storage 188. Some carbon monoxide is introduced to a hydrogen generator 192 via line 190 wherein steam is injected from steam source 172 and reacted with the carbon monoxide for the production of additional hydrogen. The hydrogen is passed through final purification unit 194 wherein unreacted carbon monoxide, carbon dioxide, and water are removed with the resulting highly purified hydrogen gas being taken off via line 196.

The ratio of carbon monoxide to cobalt oxide in the various desulfurizers, and the velocity of the gases passing therethrough, are such that only a small percentage of the carbon monoxide will go to carbon dioxide, while substantially all of the sulfur content, a relatively small percentage in the first place, reacts to form a sulfide and is thereby removed from the gases. This is as opposed to the cobalt oxide beds in the chambers surrounding the gasifiers. There, the ratios and velocities are such that substantially all of the carbon monoxide goes to carbon dioxide.

The following examples are illustrative of the process of this invention:

EXAMPLE I In a bench scale unit, essentially pure carbon was charged to a gasifier and partially burned with air to bring the bed temperature up to 2250° F. The air was stopped and carbon dioxide at 1900° F was injected into the bed. The pressure of the process was carried out at 50 psia. The outlet gases with an average molar concentration of 80.5% carbon monoxide, 18.2% carbon dioxide and 1.3% impurities with an average temperature of 2075° F was filtered in a slag bed filter and cooled to 450° F. The flow rate (avg.) of the gases was 2.1 lbs./hr. The gases were injected into a hydrogen generator, along with steam at 450° F and 1.21 lbs./hr., which contained a catalyst composed of a mixture of copper, zinc and chromium oxides. This operation was carried out at essentially 50 psia. The exit gases were dried to remove the water and the carbon dioxide was removed by an absorption system of conventional design. The gases from this operation were heated to 650° F and injected into another reactor containing an iron catalyst for the conversion to methane. The reactor was maintained at approximately 700° F and 50 psia. The exit gases contained the following concentration gas (molar): 1.8% hydrogen, 40.9% methane, 9.3% carbon monoxide, 44.3% carbon dioxide, 1.9% water vapor and 1.8% heavier hydrocarbon gases. After drying and removing the carbon dioxide, a gas was obtained with a gross heating value of approximately 900 Btu/ft$^3$.

EXAMPLE II In a bench scale unit, char, with the following composition (wt %), was placed inside a gasifier and partially burned with air to bring the bed temperature to 2300° F. (moisture free)

| C | 75.9% | $O_2$ | 0.1% |
|---|---|---|---|
| $H_2$ | 1.6% | $N_2$ | 1.4% |
| S | 3.2% | Ash | 17.8% |

The air was stopped and carbon dioxide at 1925° F was injected into the bed. The pressure of the gasifier was maintained at 300 psia. The outlet gases were filtered, cooled to 500° F and desulfurized in a cobalt oxide reactor. After desulfurization, the average gas composition was 76.9% carbon monoxide, 16.6% carbon dioxide, 0.9% methane, 0.3% nitrogen and 5.3% hydrogen (molar comp.). The desulfurized gases, at an average flow rate of 3.25 lbs/hr., were injected into a hydrogen generator containing a catalyst of copper, zinc and chromium oxide mixture. Steam at 500° F and at a low rate of 1.21 lbs/hr. was injected into the generator along with the gas mixture. The exit gases were dried to remove the water and the carbon dioxide was removed by a conventional carbon dioxide removal process. These gases were then heated to 700° F and injected into amethanization unit containing a methanization iron catalyst. The reactor was maintained at approximately 700°-720° F and 290-300 psia. The exit gases contained the following concentration on a molar basis: 1.4% hydrogen, 43.2% methane, 3.2% carbon monoxide, 46.8% carbon dioxide, 2.1% water vapor, 0.4% nitrogen and 2.9% heavier hydrocarbon gases (mainly ethane). After drying and removing the carbon dioxide, a gas with a gross heating value of 975 Btu/ft$^3$ was obtained.

EXAMPLE III In order to obtain carbon dioxide from carbon monoxide recycle using a higher cobalt oxide ($CO_3O_4$) several runs were made through a fixed bed reactor. In one run, carbon monoxide at 99.4% volumetric purity was injected into the reactor at 1000° F and 300 psia. Since enough cobalt oxide was present the conversion of carbon monoxide to carbon dioxide was essentially 100% since the outlet gases contained about 98 ppm of carbon monoxide. The bed temperature was maintained at essentially 1200° F with coolant circulation through coils within the reactor.

EXAMPLE IV Another run using a mixture of 82.3% carbon monoxide, 16.9% hydrogen and 0.8% impurities, a volumetric percent, was injected into the metal oxide reactor. The pressure of the unit was 50 psia and the temperature was maintained at 1250° F by coolant circulation through coils within the reactor. The inlet gas temperature was 1200° F. The exit gases contained 54 ppm of carbon monoxide and 28 ppm of hydrogen giving essentially complete conversion of the hydrogen and carbon monoxide.

It can be seen that the method of this invention provides a highly economical method for producing high purity carbon monoxide gas, hydrogen gas, and synthetic natural gas.

In a general manner, while there have been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

We claim:

1. A method of producing synthetic natural gas comprising the steps of producing carbon dioxide by reacting carbon monoxide with a cobalt oxide in a first bed, reacting the carbon dioxide with carbon in a hot carbonaceous bed to produce a carbon monoxide-rich gas, reacting a portion of said carbon monoxide with steam in the presence of a catalyst in a hydrogen generator to produce hydrogen, and reacting additional amounts of carbon monoxide with said hydrogen to produce a high methane content gas.

2. The method of claim 1 and including the step of desulfurizing said carbon monoxide prior to the hydrogen production step.

3. The method of claim 2 wherein said desulfurization step includes reacting sulfur with cobalt oxide in a second bed to form cobalt sulfide thereby separating sulfur from the carbon monoxide-rich gases, and alternately oxidizing said cobalt sulfide with the introduction of air to produce sulfur dioxide.

4. The method of claim 1 and including an air-burn cycle wherein excess air in introduced to said first bed of cobalt oxide to oxidize it in an exothermic reaction back to its higher oxide form after having been reduced by the introduction of said carbon monoxide, and wherein said air is heated and introduced to said carbonaceous bed for burning it to a higher temperature.

5. The method of claim 4 and including the step of desulfurizing the gaseous product of said air-burn cycle by reacting the sulfur in the gases with cobalt oxide to form a sulfide.

6. The method of claim 4 wherein two or more gasifiers are used alternately for continuous operation.

7. A method of producing synthetic natural gas which method comprises a. continuously feeding a carbonaceous material to a first carbon gasifier in contact with cobalt oxide, contacting and reacting said cobalt oxide with carbon monoxide to reduce said cobalt oxide and oxidize said carbon monoxide to carbon dioxide exothermally passing said heated carbon dioxide through said carbonaceous material, said heated carbon dioxide reacting with said carbonaceous material to produce carbon monoxide, passing the resulting gases through a high temperature filter, recycling a portion of said gases to said carbon gasifier, removing the remaining gases to a desulfurizer containing cobalt oxide, wherein the sulfur content of said gas is reduced by reaction with said cobalt oxide and cobalt sulfide produced reacting said cobalt sulfide with air to produce sulfur dioxide and removing said sulfur dioxide, passing the desulfurized gases to a hydrogen generator wherein carbon monoxide is reacted with steam to produce hydrogen, passing the resulting gases to a separation unit wherein carbon dioxide and water are removed, passing remaining gases to a methanation unit, and producing a high methane content synthetic natural gas;

b. simultaneously, in a second carbon gasifier, wherein the process of (a) has been previously conducted, introducing air into the reduced cobalt oxide to oxidize said reduced cobalt oxide, passing the resulting gases through the carbonaceous material contained therein to heat said carbonaceous material, removing said gases through a filter to a cobalt oxide bed to remove sulfur as in (a), regenerating said cobalt oxide beds cyclically by air oxidation, and c. alternating (a) and (b) cyclically to produce a continuous production of synthesis natural gas.

* * * * *